United States Patent [19]

Kotani

[11] Patent Number: 4,770,598

[45] Date of Patent: Sep. 13, 1988

[54] APPARATUS FOR TRANSFER WITH AN INCREASED SPEED

[75] Inventor: Susumu Kotani, Kyoto, Japan

[73] Assignee: Kabushiki Kaisha Yushin Seiki, Kyoto, Japan

[21] Appl. No.: 92,105

[22] Filed: Sep. 2, 1987

[30] Foreign Application Priority Data

Nov. 13, 1986 [JP] Japan ............................... 61-270054

[51] Int. Cl.$^4$ ............................................. B65G 65/00
[52] U.S. Cl. ....................................... 414/752; 74/110
[58] Field of Search ................................ 414/749–753; 74/110; 187/19; 212/209, 211, 228

[56] References Cited

U.S. PATENT DOCUMENTS

| | | | |
|---|---|---|---|
| 3,820,667 | 6/1974 | Critchlow et al. | 414/752 X |
| 3,892,324 | 7/1975 | Faletti, Jr. | 414/749 |
| 3,949,620 | 4/1976 | Zehnder | 74/110 |

Primary Examiner—Robert J. Spar
Assistant Examiner—Donald W. Underwood
Attorney, Agent, or Firm—Armstrong, Nikaido, Marmelstein & Kubovcik

[57] ABSTRACT

Apparatus for transferring an article is equipped with an arrangement for increasing or multiplying an output speed, wherein an original transfer move is produced by a linear extendable power cylinder unit and this basic linear move is made use of rolling a pinion, which is adapted to roll on a rack, and co-axially with the pinion, a pulley is provided with a diameter larger than that of the pinion, thereby in rotation the co-axial pulley being capable of rendering a larger peripheral speed, this larger peripheral speed is converted to a linear transfer move by belting arrangement so that the converted linear transfer move may be added to the basic linear move, thereby output speed is sum of the basic move and the converted move which was once transformed to rotation from the basic linear move. Magnitude of multiplication may be changed by change of a diametric enlarging ratio between the pinion and the co-axial pulley.

3 Claims, 4 Drawing Sheets

APPARATUS FOR TRANSFER WITH AN INCREASED SPEED

FIELD OF THE INVENTION

This invention relates to an apparatus for moving an article with a speed which is enlarged through an intermediate arrangement connected to an original drive. More particularly, this invention relates to an apparatus for transferring an article by a novel arrangement which multiplies its output speed as compared to that produced by a drive source.

DESCRIPTION OF THE CONVENTIONAL ART

The titled art, apparatus for transfer with an increased speed, is useful, for instance, to a plastic injection molding machine, wherein such an apparatus is necessary to remove and to transfer a freshly molded article from a mold so instantly just after opening of the mold mouth in consecutive molding cycles. A conventional handling carriage for the above application comprises a handling means for holding a freshly molded article and also a drive mechanism in carriage body, which has caused such difficulties that the handling carriage was inevitably made heavy, large in size and accordingly, positional controls for a handling means at its removal operation and also at its fetch-back operation became imprecise under need of quick operation.

Recently, further quick operation is required with the above transfer apparatus, particularly in the case of injection-molding thin, not thick articles, for instance, compact disks, optical disk, because such thin articles are molded with so short cycle times in molding, which follows that process operations from a foregoing cycle to a next cycle, including removal of a molded article, should be finished in so short time to keep up with quickness in molding cycle.

SUMMARY OF THE INVENTION

In view of the conventional difficulties and the purpose to be attained, this invention offers a novel apparatus, wherein devices necessary for drive source, for instance, push cylinder, motor, are demounted from the carriage or a handling means to be reciprocated to work and thus the drive devices are mounted separately from the the handling means, to which drive force is transmitted through intermediate arrangement including a combination of rack/pinion and a co-axial pulley having speed multifying adaptability and also meshed belting arrangement, in summary.

In other words, this invention is summarized in that, apparatus for transferring an article with multiplication in output speed, comprising: a frame box which accommodates a power cylinder unit to make an original move by extending/retracting a piston rod for a basic length longitudinally of the frame box; a rack and pinion combination wherein the rack is secured longitudinally on the frame box and is enmeshed with the pinion; a transfer carriage which is adapted to slide longitudinally of the frame box by drive-connection with the power cylinder and also with aid of the rack/pinion combination wherein said pinion is borne on the transfer carriage with free rotatability and is co-axially connected with a pulley having a larger diameter than that of the pinion, and further connected to the carriage is a transfer frame in which a toothed belt is entrained to run over said co-axial pulley and other rollers arranged therein with an increased speed as compared to that of the original cylinder; a handling means which is adapted to move for holding an intended article on the transfer frame by drive-connection with said entrained belt.

Thus, a move of the power cylinder or drive source will transmit, via rack/pinion and co-axial pulley and belting, to the handling means, wherein the original move is increased in proportion to an enlarging ratio between the pinion and the co-axial pulley, in addition to the original move by the cylinder.

BRIEF DESCRIPTION OF THE DRAWINGS

The drawings show (an) embodiment(s) of this invention, wherein.

Figure 1:
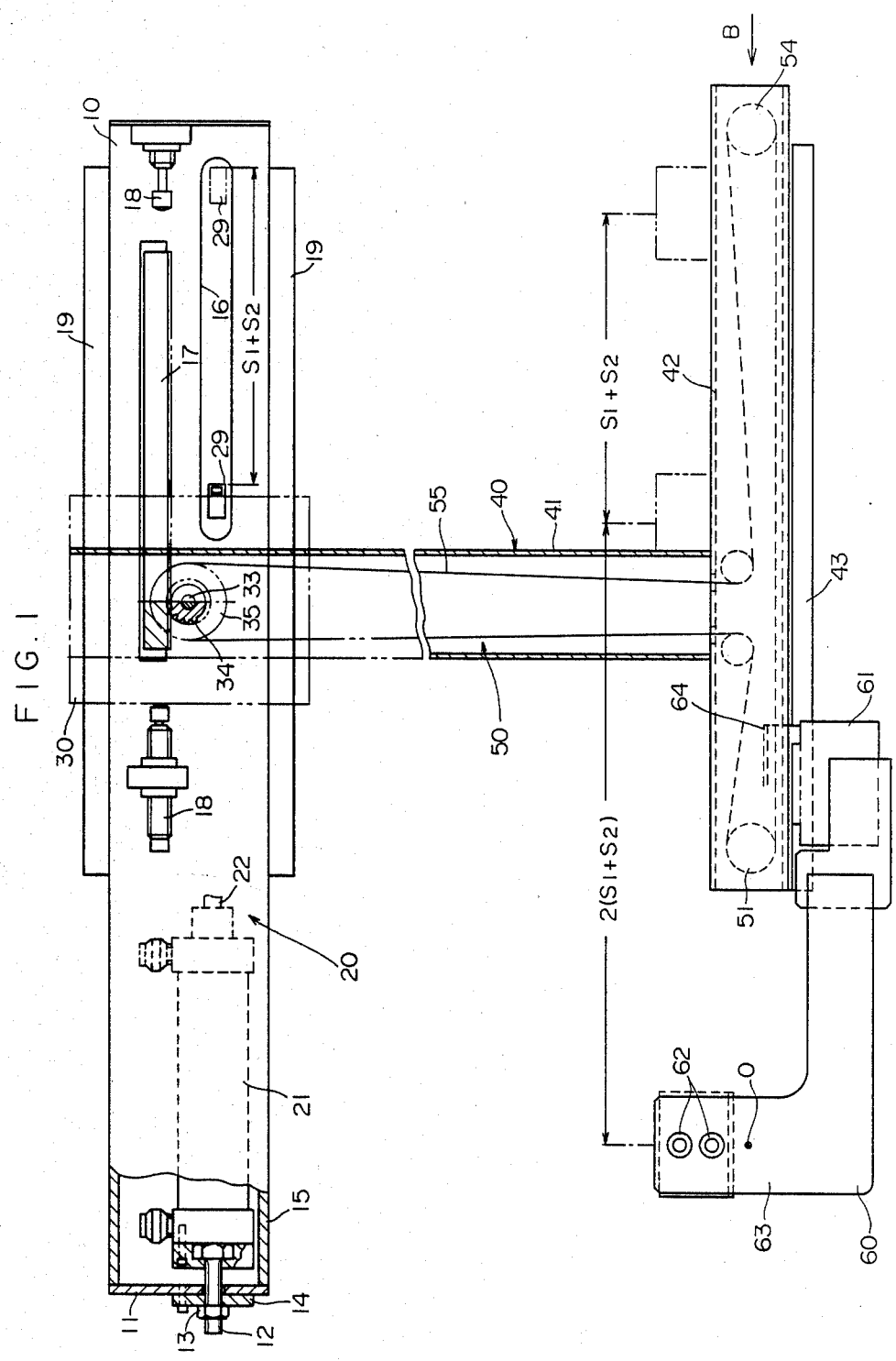
FIG. 1 shows an elevational front view of the inventive apparatus, with partial breaks.

These drawings are presented by way of illustrating the invention and therefore these should not be construed to limit the invention.

DETAILED DESCRIPTION OF THE INVENTION

In the following, the invention will be described with reference to the drawings.

As is seen in FIG. 1 through FIG. 4 (mainly in FIG. 1), the inventive apparatus is basically constructed of: a frame box 10 which shapes generally a long lateral box and is assumed to be fixed horizontally on some basis (not shown) at a suitable elevational position; and in the interior of the box 10, a coupled power cylinder unit 20 (best seen in FIG. 2) is mounted so that one cylinder may move or reciprocate longitudinally of the box 10; a transfer carriage 30 which is drive-connected to the cylinder unit 20 so that the carriage 30 may move or transfer relative to the box 10; a transfer frame 40 which shapes generally an inverted T letter and is secured to the carriage 30 so that the transfer frame 40 may move or transfer in unity with the carriage 30; a belting arrangement 50 which is entrained in the interior of the frame 40 and is adapted to run with an increased speed as compared to that of the cylinder 20; a handling means 60 which is drive-connected to the belting 50 and is adapted to slide or move on a lower horizontal channel portion of the frame 40; whereby the handling means 60 is disposed to move with a speed, of which increment against that of an original speed of the cylinder 20 may be determined according to a desired scheme as will be understood in the following.

Below, further details of respective portions in the above will be described in series.

In the frame box 10, two air cylinders 21, 24 are set in head-to-head coupling to define the cylinder unit 20 as noted, wherein the air cylinder 21 is secured to a left side wall 11 of the box 10 with use of a bolt 12 and a nut 13 and 14 is a liner plate to make positional adjustment by interposition. A piston rod 22 of the cylinder 21 is coupled with use of a nut 23 to a piston rod 25 of the cylinder 24, which is slidably set on a floor 15 longitudinally of the box 10. Then, when the two cylinders 21, 24 are put in power, the cylinder 24 is adapted to move to right for a distance made by the sum of extensions with the two pistons 22, 25. And 28 is a guide plate set in the box 10 to guide the cylinder 24.

Figure 2:
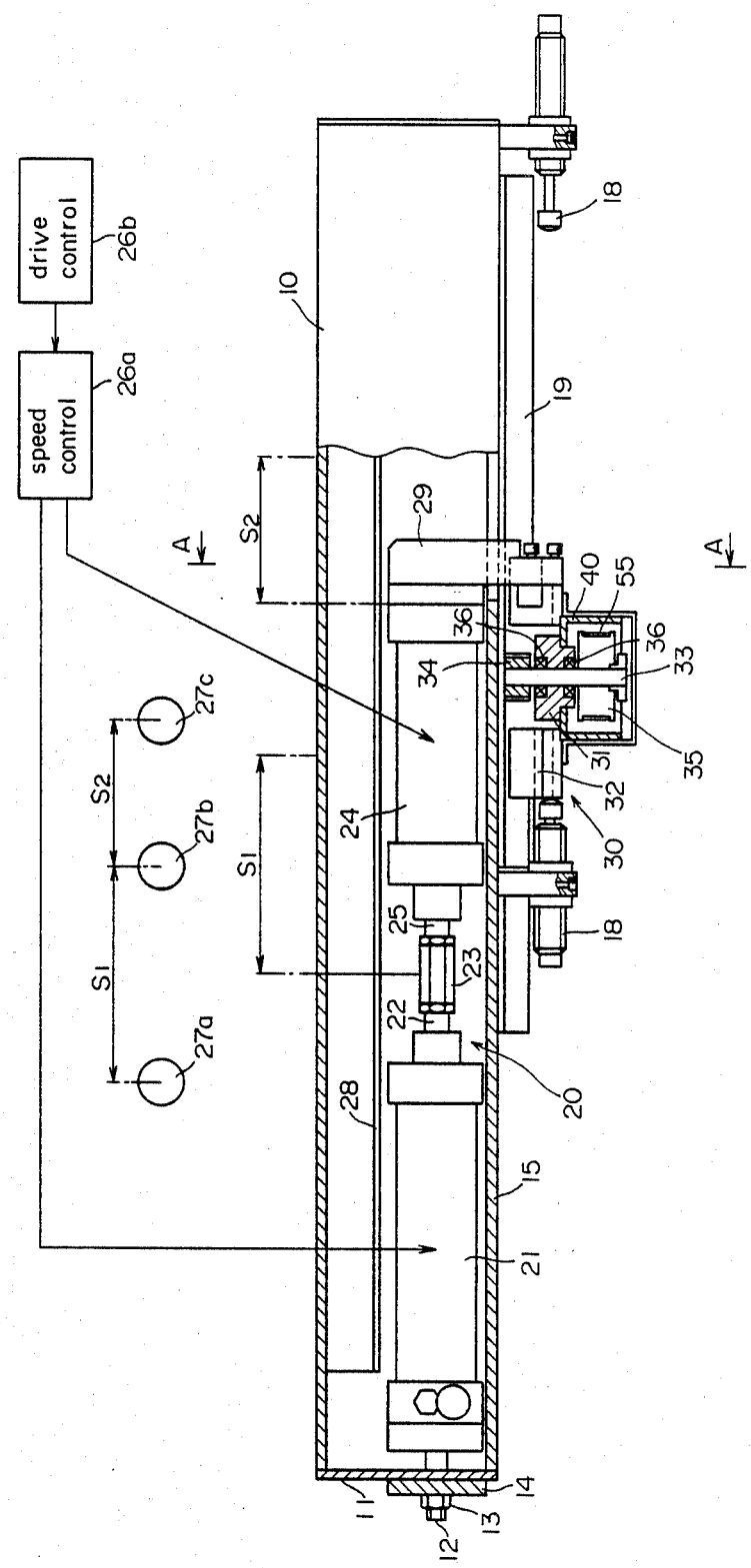
FIG. 2 shows a plan view of the same apparatus with partial breaks.

As noted in FIG. 2, it is assumed that stroke length of the piston 22 (cylinder 21) is set as S1 and the same length of the piston 25 is set as S2. 26a is a speed control or an air throttle valve to adjust air flow to be fed to the cylinders 21, 24 and 26b is a drive control, connected with the speed control 26a, to adjust a valve aperture of the speed control 26a, thereby controlling speed and stop point of the cylinder 24 or extensions of the pistons 22, 25. Further 27a, 27b and 27c are proximity sensors mounted at suitable points alongside the cylinders to monitor positions of the cylinders in action and thereby the drive control 26b is disposed, with use of monitor signals, to stop points of the pistons. Positional determinations of these sensors 27a, 27b and 27c are, as will be described later, related to operations of the handling means 60, that is; catching action of an article, standby and delivery of the article.

Figure 3:
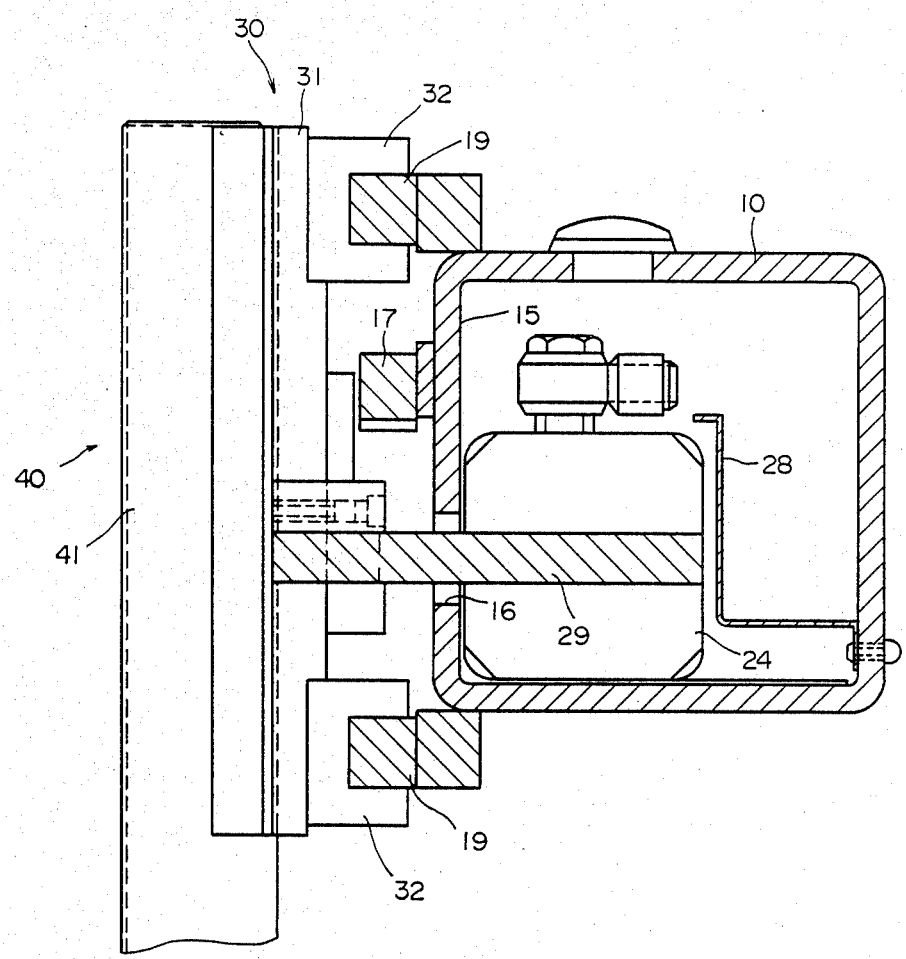
FIG. 3 shows a sectional elevation view as seen from A—A line noted in FIG. 2.

At open end of the cylinder 24, a connection plate 29 is attached to project out to the front through a lateral opening 16 formed on a front wall 15 of the box 10 (see FIGS. 2 and 3, and orientation of "front and rear" will be maintained in the description as is understood by these drawings). And length of the lateral opening 16 is made to amply cover the stroke length of S1+S2 and then the carriage 30 is secured to front portion of the connection plate 29 so that the carriage 30 may move along outside of the box 10. At a distance above the opening 16 on the front wall 15, a rack 17 is attached horizontally.

The carriage 30 is generally constructed of a carriage body 31, shaping a square columnar body, and linear bearings 32, 32 formed at top and bottom of the body 31 in a shape of concave. And loosely engaged in the concaves 32, 32 are guide rails 19, 19 which are formed or secured outwardly on top and bottom of the box 10. Then the carriage 30 is connected with the connection plate 29 at an intermediate position on the body 31. Thus a move of the cylinder 24 leads the carriage 30 to move, relative to the box, with guide of the guides 19, 19, in unity with a speed equal to the cylinder. At the both ends of stroke range of the carriage 30, buffer devices 18, 18 are provided opposedly to let its stop actions be smooth.

At a central portion of the carriage body 31, a rotation shaft 33 is provided through and at rear end of the shaft 33, a pinion 34 is mounted to enmesh with the rack 17 noted before. (note that in FIG. 2, the rack 17 is abbreviated and in FIG. 3, the pinion 34 is abbreviated for simplicity). At front portions of the shaft 33, a pulley 35 is mounted, of which diameter is, assuming in the instant embodiment, set twice the diameter of the pinion 34 and the shaft 33 is borne rotatably by bearings 36, 36. Thus, it is understood that move of the carriage 30, drive-connected to the cylinder, will lead the pinion 34 to roll on the rack 17 making concurrent rotations of the co-axial pulley 35 with twice peripheral speed to that of the pinion 34.

The carriage body 31 is connected with top end of the transfer frame 40 which is made of channel form and shapes generally an inverted T letter as noted before, wherein its vertical portion is numbered 41 and its lower lateral or horizontal portion, sectionally concave sideward, is numbered 42. Inside the lateral portion 42, four tension rollers are arranged as shown in FIG. 1 and a timing belt or toothed belt 55 is entrained to run in tension over these rollers and the pulley 35. And a guide rail 43 is laid on bottom face of the channel form 42 for almost all length thereof.

Figure 4:
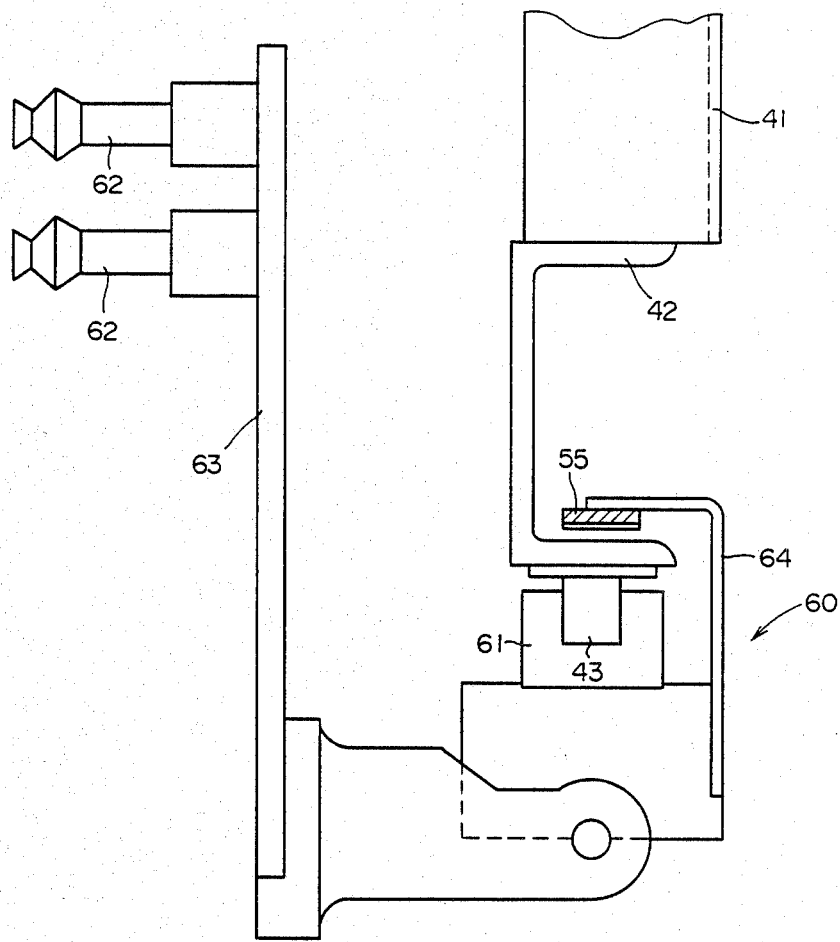
FIG. 4 shows a partial side view as indicated by an arrow mark B noted in FIG. 1.

As shown in FIG. 4, the timing belt 55 is drive-connected with the handling means 60, which is constructed of; a slide block 61 having engagement with the guide rail 43 to be slid thereon; a connection member 64 having attachment with the belt 55; a handling body 63 being pivotably attached to the slide block 61 and having vacuum suck cylinders 62, 62 on its front.

In operation, the handling means 60 is adapted to hold or to grip, specifically, by sucking action of the vacuum cylinders 62, 62, a freshly molded article as will be noted later and to transfer it with aid of drive-connection to entraining run of the belt 55 toward a delivery point. Therefore, the distance between the rollers 51 and 54 is so set that the connection member 64 may not interfer with these rollers 51, 54 during its reciprocations.

Making reference to outcome of increment in speed between the cylinder unit 20 and the transfer means 60, speed increment obtained is three(3) times with the embodiment above, which is explained in that move of the cylinder 20 for S1+S2 makes move of the transfer carriage 30 or that of the frame 40 for the same S1+S2 while the pinion 34 enmeshed with the rack 17 makes rolling action in line with speed of the cylinder 20 and concurrently the co-axial pulley 35 having twice diameter as noted before rotates with twice peripheral speed against the pinion 34, which gives the timing belt 55 the same twice speed or move for distance of 2(S1+S2). Consequently, the handling means 60 is entitled to move for (S1+S2) brought by drive-connection with the transfer frame 40 or the carriage 30 in addition to the run made by the timing belt 55 for 2(S1+S2), which follows to give the sum of them or 3(S1+S2). In other words, the above embodiment deserves an apparatus to produce treble speed based on an original move.

Into the above embodiment, various modifications may be introduced. For instance, the cylinder unit 20 is not limited to air cylinders, but hydraulic cylinders or electrical motors may substitute therefor. Further, the belting arrangement 50 including the timing belt 55, pulley 35 may be substituted with a chain/sprocket arrangement. Diametric enlargement ratio between the pulley 35 and the pinion 34 employed in the above embodiment should not be construed as limitative. A suitable value for the ratio or a magnitude of multiplications may be optionaly determined case by case.

Proceeding to description that the inventive apparatus is applied to remove and to transfer a thinly molded article. First, referring to FIG. 1, position of the handling body 63 for removal of the article is set or adjusted so that center of a target mold (not shown) may positionally correspond to a point marked 0, which is set to be position for access or removal operation and at this time also assumed is that the rods 22, 25 of the cylinders 21, 24 are both at zero stroke position, which is assumed to be sensed by the sensor 27a. Status of the rod 22 of the cylinder 21 at S1 is set to be standby position, which is also assumed to be sensed by the sensor 27b. Status of the rod 22 at S1 and the rod 25 at S2 stroke length is set to be delivery position, which is also assumed to be sensed by the sensor 27c.

In operation, first, the handling body 63 is positioned at standby and thence the rod 22 of the cylinder 21 is retracted so that the handling body 63 will be moved to the access position. Then, some drive signal is issued from a control circuit (not shown) to the suck cylinders 62, 62, which thereby will hold a freshly molded article (not shown) with sucking action. At this moment, the drive control 26b receives a monitor signal from the sensor 27a and thereby will issue a drive signal to the cylinder 21 to extend the rod 22 for S1 stroke.

Next, when the sensor 27b issues a proximity signal to the drive control 26b, which will thereby put the cylinder 24 in action to extend the rod 25 for S2. Then, the drive circuit noted before issues to the suck cylinders 62, 62 a signal for stop of sucking action, by which the article is laid on some delivery system (not shown). Now, when the drive control 26b receives a signal from the sensor 27c, the cylinder 24 will be put in action to retract the rod 25 and thereby the handling body 63 will be back to standby. Thus one cycle of operation is finished and thereafter, the same operation may be repeated as required.

In the above operation, some differentiation in speed with the handling body 63 may be introduced for respective move actions in order to perform better handling of a thinly molded article which is liable to hurt. For such purpose, suitable differentiation is such that moves from standby to access, from access to standby and from delivery to standby are made quick, but move from standby to delivery is made slow by adjusting operation speeds with the cylinders 21, 24.

Such speed differentiation as noted above is particularly helpful in handling frail thin articles without hurt, but this invention is not limited in handling such difficult articles and is applicable to handling thick or less frail articles.

CONCLUSION

In the inventive apparatus, handling means is avoided from loading devices for drive, for which the handling means is made light in weight and thereby is made suitable to perform an exact stop operation. Further, the handling means is set on a transfer frame, in other words, is not directly connected with a drive source, for which the handling means is set on a sturdy base, in alternative, and is therefore avoided from vibrations to be caused in power transmission.

In addition, the inventive apparatus is equipped with function of multiplying a speed to output and is avoided from causes which will hinder a quicker operation with the handling means. Accordingly, this invention will be advantageously applied to such a plastic molding machine as to mold frail thin articles under need of higher productive efficiency.

I claim:

1. Apparatus for transferring an article with increase in output speed, comprising: a frame box which accommodates a power cylinder unit to make an original move by extending/retracting a piston rod for a basic length longitudinally of the frame box; a rack and pinion combination wherein the rack is secured longitudinally on the frame box and is enmeshed with the pinion; a transfer carriage which is adapted to slide longitudinally of the frame box by drive-connection with the power cylinder and also with aid of the rack/pinion combination wherein said pinion is borne on the transfer carriage with free rotatability and is co-axially connected with a pulley having a larger diameter than that of the pinion, and further connected to the carriage is a transfer frame in which a toothed belt is entrained to run over said co-axial pulley and other rollers arrranged therein with an increased speed as compared to that of the original cylinder; a handling means which is adapted to move for holding an intended article on the transfer frame by drive-connection with said entrained belt.

2. Apparatus for transferring an article with increase in output speed as noted in claim 1: wherein the frame box is positioned horizontally at a higher position in whole layout of the inventive apparatus; and the rack/pinion combination is positioned at the same elevational level as the frame box; and the transfer carriage comprising the pinion and the co-axial pulley is connected with the transfer frame shaping generally an inverted T letter at top end portion of the inverted T, thereby a vertical and a lower horizontal portion being formed; and the handling means is engaged with the lower horizontal portion of the inverted T.

3. Apparatus for transferring an article with increase in output speed as noted in claim 1, wherein combination of the co-axial pulley and the toothed belt is that of a sprocket and a chain belt.

* * * * *